United States Patent
Wijnands et al.

(10) Patent No.: US 10,498,547 B2
(45) Date of Patent: *Dec. 3, 2019

(54) BIT INDEXED EXPLICIT REPLICATION

(71) Applicant: Cisco Technology, Inc., San Jose, CA (US)

(72) Inventors: Ijsbrand Wijnands, Leuven (BE); Gregory J. Shepherd, Eugene, OR (US); Christian J. Martin, Rumson, NJ (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/827,084

(22) Filed: Nov. 30, 2017

(65) Prior Publication Data

US 2018/0083790 A1 Mar. 22, 2018

Related U.S. Application Data

(63) Continuation of application No. 14/488,761, filed on Sep. 17, 2014, now Pat. No. 9,853,822.

(Continued)

(51) Int. Cl.
*H04L 12/18* (2006.01)
*H04L 12/761* (2013.01)
(Continued)

(52) U.S. Cl.
CPC .......... *H04L 12/18* (2013.01); *H04L 12/1886* (2013.01); *H04L 45/16* (2013.01);
(Continued)

(58) Field of Classification Search
CPC ..... H04L 12/18; H04L 12/1886; H04L 45/16; H04L 45/74; H04L 45/18; H04L 45/50
(Continued)

(56) References Cited

U.S. PATENT DOCUMENTS

| | | | |
|---|---|---|---|
| 5,088,091 A | 2/1992 | Schroeder | |
| 5,138,615 A | 8/1992 | Lamport | 370/400 |

(Continued)

FOREIGN PATENT DOCUMENTS

| | | | |
|---|---|---|---|
| CN | 1754 353 | 3/2006 | |
| CN | 1792 065 | 6/2006 | H04L 12/56 |

(Continued)

OTHER PUBLICATIONS

Wijnands, Ijsbrand et al., "Bit Indexed Explicit Replication Using Internet Protocol Version 6"; U.S. Appl. No. 15/919,552, filed Mar. 13, 2018 consisting of Specification, Claims, Abstract, and Drawings (49 pages).

(Continued)

*Primary Examiner* — Christopher R Crompton
(74) *Attorney, Agent, or Firm* — Campbell Stephenson LLP

(57) ABSTRACT

Methods, devices and computer readable storage media for performing bit indexed explicit replication (BIER) are disclosed. One embodiment of a method includes receiving, at an ingress node of a network, a data packet comprising a multicast group identifier. This embodiment also includes obtaining, from a group membership table, a bit mask corresponding to the multicast group identifier. The bit mask comprises a plurality of bit positions, and each bit position corresponds to a respective egress node of the network. The embodiment also includes encapsulating the data packet with the bit mask and forwarding the encapsulated data packet using the bit mask.

20 Claims, 9 Drawing Sheets

Related U.S. Application Data

(60) Provisional application No. 61/931,473, filed on Jan. 24, 2014, provisional application No. 61/878,693, filed on Sep. 17, 2013.

(51) Int. Cl.
    *H04L 12/741* (2013.01)
    *H04L 12/723* (2013.01)
    *H04L 12/705* (2013.01)

(52) U.S. Cl.
    CPC .............. *H04L 45/74* (2013.01); *H04L 45/18* (2013.01); *H04L 45/50* (2013.01)

(58) Field of Classification Search
    USPC ........................................................ 370/390
    See application file for complete search history.

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,130,881 A | 10/2000 | Stiller | 370/238 |
| 6,147,976 A | 11/2000 | Shand | 370/254 |
| 6,148,000 A | 11/2000 | Feldman | 370/394 |
| 6,240,188 B1 | 5/2001 | Dondeti | 380/284 |
| 6,615,336 B1 | 9/2003 | Chen | 370/351 |
| 6,771,673 B1 | 8/2004 | Baum | 370/535 |
| 6,778,532 B1 | 8/2004 | Akahane | 370/389 |
| 6,873,627 B1 | 3/2005 | Miller | |
| 7,111,101 B1 | 9/2006 | Bourke | 326/40 |
| 7,281,085 B1 | 10/2007 | Garg | 370/235 |
| 7,519,733 B1 | 4/2009 | Thubert | 709/232 |
| 7,551,599 B2 | 6/2009 | Levit | 370/254 |
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,670,146 B1 | 3/2014 | Van Couvering | 358/1.15 |
| 8,774,179 B1 | 7/2014 | Gaggara | 370/389 |
| 8,787,400 B1 | 7/2014 | Barth | 370/419 |
| 8,830,826 B2 | 9/2014 | Chen | 370/228 |
| 8,848,728 B1 | 9/2014 | Revah | 370/386 |
| 8,880,869 B1 | 11/2014 | Shah | 713/151 |
| 8,890,903 B2 | 11/2014 | Russell | 345/690 |
| 8,942,256 B1 | 1/2015 | Barth | 370/255 |
| 9,065,766 B2 | 6/2015 | Matsuoka | |
| 9,455,918 B1 | 9/2016 | Revah | |
| 2002/0126661 A1 | 9/2002 | Ngai | 370/380 |
| 2002/0191628 A1 | 12/2002 | Liu | 370/428 |
| 2003/0043802 A1 | 3/2003 | Yazaki | 370/389 |
| 2003/0088696 A1 | 5/2003 | McCanne | 709/238 |
| 2003/0142685 A1 | 7/2003 | Bare | 370/410 |
| 2003/0210695 A1 | 11/2003 | Henrion | 370/392 |
| 2004/0190527 A1 | 9/2004 | Okura | 370/395.21 |
| 2004/0240442 A1 | 12/2004 | Grimminger | 370/389 |
| 2004/0264374 A1 | 12/2004 | Yu | 370/230 |
| 2005/0157724 A1 | 7/2005 | Montuno | 370/392 |
| 2005/0169270 A1 | 8/2005 | Mutou | 370/390 |
| 2005/0181807 A1 | 8/2005 | Dowling | 455/456.1 |
| 2005/0232272 A1 | 10/2005 | Deng | 370/390 |
| 2006/0133298 A1 | 6/2006 | Ng | 370/254 |
| 2006/0182035 A1 | 8/2006 | Vasseur | 370/238 |
| 2006/0187817 A1 | 8/2006 | Charzinski | 370/216 |
| 2006/0280192 A1 | 12/2006 | Desanti | 370/409 |
| 2006/0291444 A1 | 12/2006 | Alvarez | 370/351 |
| 2007/0127474 A1 | 6/2007 | Mirtorabi | 370/390 |
| 2007/0189291 A1 | 8/2007 | Tian | 370/390 |
| 2008/0069125 A1 | 3/2008 | Reed | 370/410 |
| 2008/0159285 A1 | 7/2008 | De Heer | 370/390 |
| 2008/0165783 A1 | 7/2008 | Desanti | 370/392 |
| 2008/0194240 A1 | 8/2008 | Dowling | 455/414.3 |
| 2008/0212465 A1 | 9/2008 | Yan | 370/225 |
| 2008/0240105 A1 | 10/2008 | Abdallah | 370/392 |
| 2008/0316916 A1 | 12/2008 | Tazzari | 370/216 |
| 2009/0067348 A1 | 3/2009 | Vasseur | 370/256 |
| 2009/0185549 A1 | 7/2009 | Shon | 370/379 |
| 2009/0196289 A1 | 8/2009 | Shankar | 370/390 |
| 2009/0213735 A1 | 8/2009 | Check | 370/236 |
| 2009/0219817 A1 | 9/2009 | Carley | 370/235.1 |
| 2009/0225650 A1 | 9/2009 | Vasseur | 370/218 |
| 2009/0310610 A1 | 12/2009 | Sandstrom | 370/394 |
| 2010/0046400 A1 | 2/2010 | Wu | |
| 2010/0046515 A1 | 2/2010 | Wong | 370/390 |
| 2010/0124225 A1* | 5/2010 | Fedyk | H04L 45/02 370/390 |
| 2010/0191911 A1 | 7/2010 | Heddes | 711/118 |
| 2011/0149973 A1 | 6/2011 | Esteve Rothenberg | 370/392 |
| 2011/0202761 A1 | 8/2011 | Sarela et al. | 716/163 |
| 2011/0228770 A1 | 9/2011 | Dholakia | 370/390 |
| 2011/0238816 A1 | 9/2011 | Vohra | |
| 2011/0274112 A1 | 11/2011 | Czaszar | 370/392 |
| 2011/0299531 A1 | 12/2011 | Yu | 370/392 |
| 2012/0075988 A1 | 3/2012 | Lu | 370/218 |
| 2012/0099591 A1 | 4/2012 | Kotha | 370/392 |
| 2012/0106560 A1 | 5/2012 | Gumaste | 370/401 |
| 2012/0198064 A1* | 8/2012 | Boutros | H04L 45/04 709/225 |
| 2012/0236857 A1 | 9/2012 | Manzella | 370/390 |
| 2012/0243539 A1 | 9/2012 | Keesara | 370/392 |
| 2013/0034097 A1 | 2/2013 | Dharmapurikar | 370/390 |
| 2013/0051376 A1 | 2/2013 | Hatashita | 370/338 |
| 2013/0107725 A1* | 5/2013 | Jeng | H04L 45/16 370/248 |
| 2013/0114595 A1 | 5/2013 | Mack-Crane | 370/390 |
| 2013/0114619 A1 | 5/2013 | Wakumoto | 370/406 |
| 2013/0136117 A1 | 5/2013 | Schrum, Jr. | 370/338 |
| 2013/0136123 A1 | 5/2013 | Ge | 370/390 |
| 2013/0170450 A1 | 7/2013 | Anchan | 370/329 |
| 2013/0195001 A1 | 8/2013 | Liu | 370/312 |
| 2013/0201988 A1 | 8/2013 | Zhou | 370/390 |
| 2013/0308948 A1 | 11/2013 | Swinkels | 398/66 |
| 2013/0329728 A1 | 12/2013 | Ramesh | 370/390 |
| 2013/0336315 A1 | 12/2013 | Guichard | 370/389 |
| 2013/0343384 A1 | 12/2013 | Shepherd | 370/390 |
| 2014/0010223 A1 | 1/2014 | Wang | 370/338 |
| 2014/0043964 A1 | 2/2014 | Gabriel | 370/229 |
| 2014/0064081 A1* | 3/2014 | Morandin | H04L 47/12 370/235 |
| 2014/0098813 A1 | 4/2014 | Mishra | 370/390 |
| 2014/0119191 A1 | 5/2014 | Onoue | 370/236 |
| 2014/0126575 A1 | 5/2014 | Janneteau | |
| 2014/0160925 A1 | 6/2014 | Xu | 370/235 |
| 2014/0189174 A1 | 7/2014 | Ajanovic | 710/106 |
| 2014/0362846 A1 | 12/2014 | Li | 370/338 |
| 2014/0369356 A1 | 12/2014 | Bryant | 370/392 |
| 2015/0003458 A1 | 1/2015 | Li | 370/392 |
| 2015/0009823 A1 | 1/2015 | Ganga | 370/235 |
| 2015/0016469 A1 | 1/2015 | Ganichev | 370/429 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1 | 3/2015 | Brown | 710/116 |
| 2015/0085635 A1 | 3/2015 | Wijnands et al. | 370/216 |
| 2015/0092546 A1 | 4/2015 | Baratam | 370/230 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0181309 A1 | 6/2015 | Wijnands et al. | 725/109 |
| 2015/0249587 A1 | 9/2015 | Kozat | 370/222 |
| 2015/0334006 A1 | 11/2015 | Shao | 370/225 |
| 2016/0087890 A1 | 3/2016 | Przygienda | |
| 2016/0119159 A1 | 4/2016 | Zhao | 370/390 |
| 2016/0127142 A1 | 5/2016 | Tian et al. | 370/390 |
| 2016/0142248 A1 | 5/2016 | Thubert et al. | 370/372 |
| 2016/0182353 A1 | 6/2016 | Garcia-Luna-Aceves | 709/241 |
| 2016/0191372 A1 | 6/2016 | Zhang | 370/390 |
| 2016/0205588 A1 | 7/2016 | Liu | 370/392 |
| 2016/0218961 A1 | 7/2016 | Lindem | 370/389 |
| 2016/0226725 A1 | 8/2016 | Iizuka | |

(56) References Cited

U.S. PATENT DOCUMENTS

| | | |
|---|---|---|
| 2016/0254987 A1 | 9/2016 | Eckert et al. ............... 370/390 |
| 2016/0254988 A1 | 9/2016 | Eckert et al. ............... 370/390 |
| 2016/0254991 A1 | 9/2016 | Eckert et al. ............... 370/225 |
| 2016/0344616 A1 | 11/2016 | Roch |
| 2017/0012880 A1 | 1/2017 | Yang |
| 2017/0099232 A1 | 4/2017 | Shepherd .................. 370/390 |
| 2017/0126416 A1 | 5/2017 | McCormick |
| 2017/0142006 A1 | 5/2017 | Wijnands et al. ........... 370/390 |
| 2018/0102965 A1 | 4/2018 | Hari |
| 2018/0205636 A1 | 7/2018 | Hu |
| 2018/0309664 A1 | 10/2018 | Balasubramanian |
| 2019/0014034 A1 | 1/2019 | Allan |

FOREIGN PATENT DOCUMENTS

| | | | |
|---|---|---|---|
| CN | 101242413 | 8/2008 | ............ H04L 29/06 |
| CN | 101385 275 | 3/2009 | ............ H04L 12/18 |
| CN | 101572667 A | 11/2009 | |
| CN | 101689 172 | 3/2010 | ........... G06F 15/173 |
| CN | 102025538 | 4/2011 | ............ H04L 12/56 |
| CN | 102577 238 | 7/2012 | ............ H04L 12/18 |
| WO | WO 2007/095331 | 8/2007 | ................. 370/390 |

OTHER PUBLICATIONS

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).

Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).

Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).

Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.; "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc.; "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Li, Tony et al., "IGP Requirements for Traffic Engineering With MPLS, draft-li-mpls-igp-te-00.txt," Network Working Group, Internet-Draft, Feb. 1999, pp. 1-6.

Microsoft, "IPv6 Addressing (TechRef)"; Apr. 3, 2011; https://technet.microsoft.com/en-us/library/dd392266(v=ws.10).aspx; pp. 1-30.

Moy, J., Ascend Communications, Inc., "OSPF Version 2," Network Working Group, Request for Comments 2328, Apr. 1998, pp. 1-244.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Psenak, P. et al., "OSPF Extensions for Segment Routing, draft-psenak-ospf-segment-routing-extension-05," Open Shortest Path First IGP, Internet-Draft, Jun. 2014, pp. 1-33.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.

Schulzrinne, H. et al.,; "RTP: A Transport Protocol for Real-Time Applications," Network Working Group, Request for Comments 3550, Jul. 2003, pp. 1-89.

Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.

Shen, N et al., "Calculating Interior Gateway Protocol (IGP) Routes Over Traffic Engineering Tunnels," Network Working Group, Request for Comments 3906, Oct. 2004, pp. 1-8.

SMPTE, "Beyond The Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

(56) References Cited

OTHER PUBLICATIONS

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

* cited by examiner

BIT INDEXED EXPLICIT REPLICATION

RELATED APPLICATIONS

The present patent application is a continuation of U.S. patent application Ser. No. 14/488,761, filed on Sep. 17, 2014, entitled "Bit Indexed Explicit Replication"; which claims the domestic benefit under Title 35 of the United States Code § 119(e) of U.S. Provisional Patent Application Ser. No. 61/878,693 entitled "Multicast IPv6 with Bit Mask Forwarding" filed Sep. 17, 2013, and U.S. Provisional Patent Application Ser. No. 61/931,473 entitled "Bit Mask Forwarding Architectures for Stateless Multipoint Replication" filed Jan. 24, 2014, both of which are hereby incorporated by reference in their entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. Three types of forwarding methods are: unicast; broadcast; and multicast. Each of the three forwarding methods involves its own set of configuration and control processes. Unicast is a method of point-to-point communication most often used when a particular node (known as a source) wishes to send data to another particular node (known as a receiver) and is not concerned with sending the data to multiple receivers. Broadcast is method used when a source wishes to send data to all receivers in a domain, and multicast allows a source to send data to a group of receivers in a domain while preventing the data from being sent to other receivers in the domain.

Multicast is the preferred method of data forwarding for many networks. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features and advantages made apparent to those skilled in the art by referencing the accompanying drawings.

DETAILED DESCRIPTION

Overview

Figure 1:
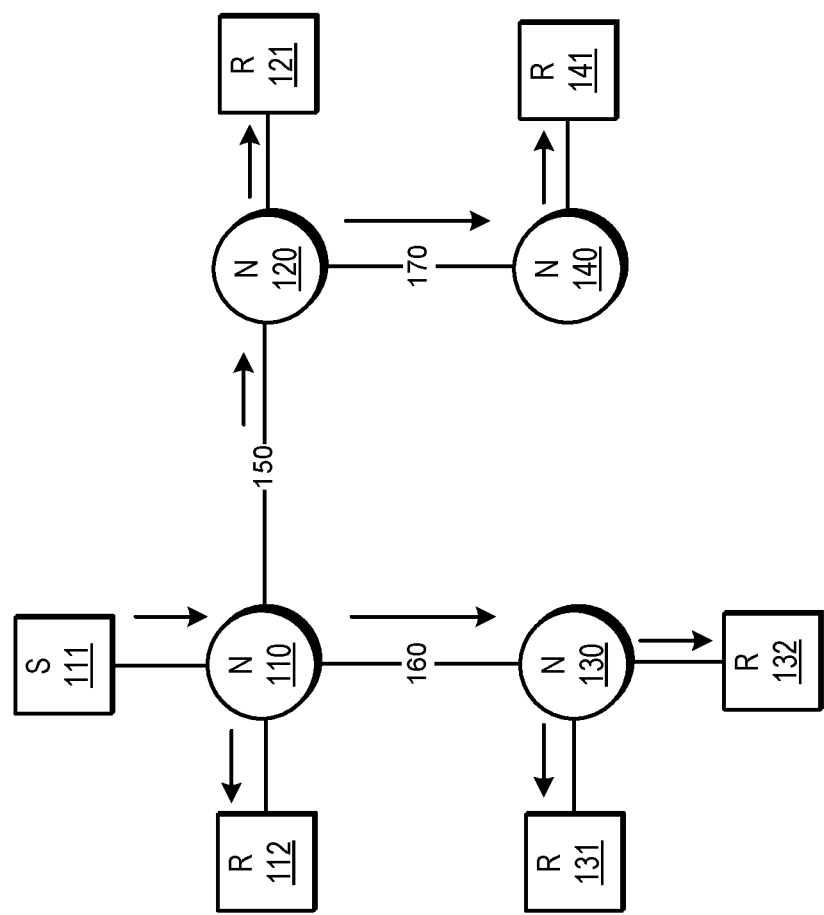
FIG. 1 is a simplified block diagram illustrating certain components of an example network.

Various systems and methods for performing bit indexed explicit replication (BIER). For example, one method involves receiving a packet at a node. The packet includes a multicast forwarding entry. The multicast forwarding entry has a plurality of elements, and each element corresponds to a particular node. The method also involves comparing the multicast forwarding entry with forwarding information stored by the node. The method involves selecting a neighbor node based on the comparing, updating the multicast forwarding entry in the packet, and forwarding the packet to the neighbor node.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Multicast is employed using various routing protocols, such as internet protocol (IP) and multiprotocol label switching (MPLS). In a multicast network (a network having multicast-enabled nodes) that uses IP, a source includes a multicast group address in packets sent to the group corresponding to the multicast group address. For example, the source can include the multicast group address as the destination address for multicast data packets. Multicast-enabled nodes can then forward the multicast data packets to the multicast group's receivers based on the multicast group address.

In MPLS, a source can likewise add a multicast group address to a packet. However, MPLS-enabled nodes forward packets, including multicast data packets, using labels rather than destination addresses. To forward multicast data packets, MPLS-enabled nodes can generate a label switched path (LSP) corresponding to a multicast group address, and can forward multicast data packets using the LSP.

Upon receiving a multicast data packet at a multicast-enabled node, the multicast-enabled node can use multicast forwarding tables maintained by the multicast-enabled node to determine which of the multicast-enabled node's interfaces (if any) the multicast data packet should be forwarded to. This involves the multicast-enabled node having knowledge of whether one or more receivers are connected to the multicast-enabled node's interfaces (either directly or indirectly). The multicast-enabled node can then replicate the multicast data packet as needed and transmit the replicated multicast data packets via the determined interface(s).

The techniques described above involve each multicast-enabled node in a given multicast network maintaining information (also referred to as state or control plane information) indicating how to forward multicast data packets so that the multicast data packets reach each receiver that has joined each group. As the numbers of groups, sources, and receivers grow, the amount of state information grows and storing and maintaining the state information (e.g., updating the state information in response to receivers joining and leaving groups) becomes more and more of a burden on the multicast-enabled nodes and the links between the multicast-enabled nodes.

One area in which the increased burden of maintaining state information is felt is convergence. Convergence, in the context of multicast, refers to the amount of time it takes for the multicast-enabled nodes in a multicast network to update state information in response to a change, such as a receiver joining a group, leaving a group, or changing its location, such that the multicast-enabled nodes all have state information that accurately reflects current group membership. The state information regarding group membership is used to generate and update forwarding tables used by the multicast-enabled nodes to replicate and forward multicast data packets.

One facet of multicast is the building of multicast distribution trees (MDTs), and multicast forwarding tables used to control where in a multicast network multicast data packets are forwarded. MDTs describe the paths through the multicast network between sources and receivers. If a receiver wants to receive multicast data packets from a given source or associated with a given multicast group address, the multicast-enabled nodes build an MDT that connects the receiver to the source. Each multicast-enabled node along the MDT builds and maintains a multicast forwarding table that indicates how a multicast data packet should be forwarded to follow the MDT.

The following example provides an illustration of the complexity of building multicast distribution trees and multicast forwarding tables. When a host that wants to receive multicast data packets for a given multicast group (or from a specific source), the host first sends a message indicating the host's interest in the multicast group (or source). The message can be, for example, an Internet Group Management Protocol (IGMP) membership report or a multicast listener discovery (MLD) report that contains information, such as a multicast group address, identifying the multicast group in which the host is interested. While group address is used here for the sake of brevity, it should be understood that the host can send a message with information identifying a particular source from which the receiver wishes to receive multicast data packets in addition to or as an alternative to information identifying a particular multicast group. In this example, the host sends the message to a customer edge (CE) node. The CE node forwards the message to a provider edge (PE) node, which can be implemented as a multicast-enabled node in the multicast network.

In response to receiving the message, the multicast-enabled node creates and stores in memory an entry in a multicast forwarding table for the group, presuming one does not already exist. Multicast-enabled nodes forward multicast data packets based on the multicast forwarding table. In one example, the entry includes information indicating an interface on which the message was received from the CE node and information identifying the group the host wishes to join. In the case of MPLS, the multicast-enabled node may also request a label be assigned to the multicast-enabled node for the group. In one embodiment, the multicast-enabled node requests a label using multipoint label distribution protocol (mLDP). The multicast-enabled node knows to forward packets subsequently received multicast data packets for that group to the interface (or using the label) specified in the entry. The multicast-enabled node can be configured with IGMP and can have "snooping" software executing to read such a message and build the corresponding entry.

The multicast-enabled node also determines an upstream multicast-enabled node. In one example, the multicast-enabled node performs a reverse path forwarding (RPF) check using the address (or prefix thereof) of a rendezvous point (RP) node or a source associated with the group the host is joining. RPF checks are used in identifying the upstream next hop node towards the RP (or source). The multicast-enabled node then sends a join message to the next hop node. The join message can be implemented using, for example, a protocol independent multicast (PIM) message. Using PIM, multicast-enabled nodes can send messages indicating that they wish to join a particular multicast group or receive multicast data packets from a particular source (a "JOIN" message). Multicast-enabled nodes can also use PIM to send a "PRUNE" message, indicating that the multicast-enabled nodes do not wish to receive packets directed to a particular multicast group or being transmitted by a particular source.

The upstream next hop node receives the join message and responds in similar fashion. More particularly, the upstream next hop node creates an entry in its routing table, presuming one does not already exist. The entry includes information that indicates how to forward multicast data packets for a particular multicast group. For example, the entry can include information identifying an interface and in the case of MPLS, a label. In response to receiving the join message, the next hop node determines an upstream next-hop node. In general this MDT building process continues with each upstream router towards the source or RP until either a join message reaches the source or RP or until the join message reaches an upstream router that has a pre-existing multicast forwarding table entry for the group or source.

When a join message reaches a multicast-enabled node that already has an entry for the group, the multicast-enabled node updates the multicast forwarding table, e.g., by adding information indicating that packets associated with the group should be forwarded to the additional interface (e.g., using a label included in the join message). Updating the multicast forwarding table completes the construction of the MDT between the source and the PE node closest to the receiver. Thereafter, multicast data packets can flow from the source to the receiver connected to the PE node via the MDT between the source and the PE node. Upon receipt by a multicast-enabled node on the MDT, multicast data packets from the source, or associated with the multicast group will be replicated as needed to provide the multicast data packets to multicast-enabled nodes on the MDT. In this manner, a multicast flow can be transmitted through a multicast network to multiple receivers. When a multicast-enabled node on the MDT receives a multicast data packet that is associated with a given group, the multicast-enabled node can access its multicast forwarding table to identify any downstream nodes on the MDT (and/or interfaces corresponding to such downstream nodes) to which the multicast data packet should be forwarded. The multicast-enabled node replicates the multicast data packet and forwards a copy of the multicast data packet toward each downstream multicast-enabled node on the MDT.

FIG. 1 is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a MDT to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using, for example, a PIM join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

As can be seen, the process traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability.

Described below are systems and methods configured to achieve some of the advantages of multicast, such as avoiding source replication of packets, without the drawbacks. Adding receiver information to multicast data packets, as described herein, facilitates simplification of the control plane.

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes.

Figure 2:
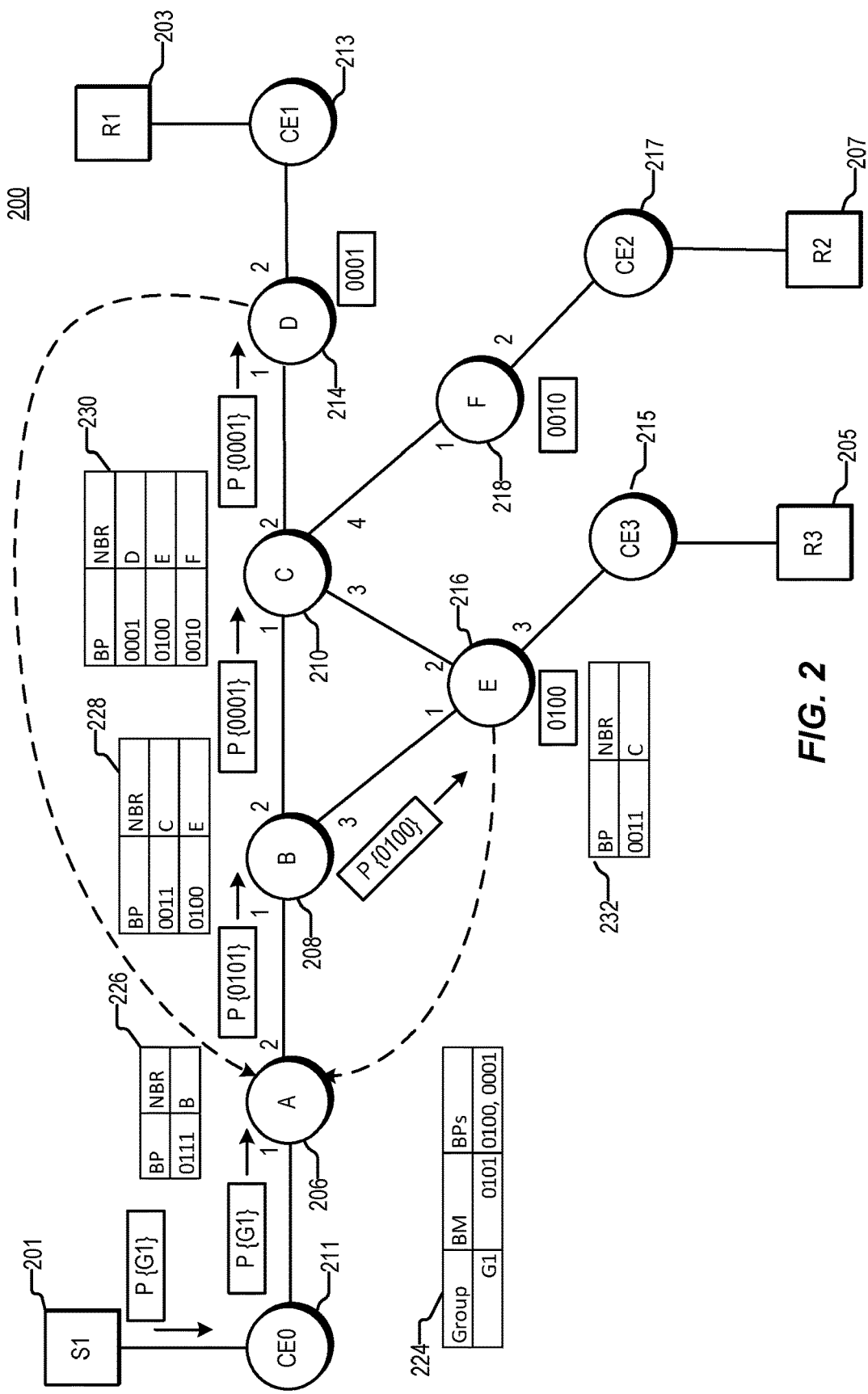
FIG. 2 is a simplified block diagram illustrating certain components of an example network.

FIG. 2 shows an example network 200. Network 200 includes BIER-enabled nodes 206-218. BIER-enabled nodes are configured to forward packets using BIER. BIER-enabled nodes 206-218 form a provider network, or domain. Such a provider network could be employed by an Internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are coupled to the customer edge nodes.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, prefix, or loopback address. Each BIER-enabled node advertises or floods the routable address to all other BIER-enabled nodes in network 200. Each BIER-enabled node builds a unicast topology of the BIER-enabled nodes in network 200 using the advertised routable addresses.

BIER-enabled node 206 is configured as an ingress router (IR) for multicast data packets. The IR is coupled, via customer edge node 211, to source 201. Multicast data packets from source 201 enter the BIER network via the IR (BIER-enabled node 206). Each of BIER-enabled nodes 214, 216, and 218 is configured as an egress router (ER). The ERs can be connected (directly or via customer edge routers) to hosts, such as receivers, or other networks. An ER is a BIER-enabled node that is the last BIER-enabled node on a path between a source and a receiver. The ER may be a provider edge (PE) node that is coupled to the receiver either directly or indirectly (e.g., through a non-BIER-enabled CE node).

Assigning a Bit Position in the Bit Mask

Each ER in a BIER network is assigned a unique bit position (BP) from a bit mask (BM). As used herein, the term bit mask refers to a set of bits that has a fixed or variable length. The length of the BM used in the BIER network can be statically configured or dynamically assigned and distributed through the BIER network. In one embodiment, the length of the BM is between 256 and 1024 bits. The maximum length of the BM value is determined, in one embodiment, by hardware or software limitations of the BIER-enabled nodes in the BIER network. In one embodiment, different BIER-enabled nodes in the BIER network use different lengths for their respective BMs. For example, one BIER-enabled node may have a maximum BM length of 128 bits while another BIER-enabled node may have a maximum BM length of 256 bits. Mechanisms to handle such non-homogenous BM sizes are described below. Also described below are various approaches to accommodate BIER networks where the number of ERs exceeds the maximum number of bits in the BM. A bit mask is one type of multicast forwarding entry in which each bit position of multiple bit positions is an element that can be used to represent an individual node or interface. Other types of multicast forwarding entries with other types of entries can be used.

A bit position (BP) assigned to an ER is statically or dynamically assigned to the ER. Each ER should have a unique bit position from the BM. In one embodiment, a central authority, such as a controller, will assign the BPs to the ERs. The controller, in one embodiment, assigns multiple BPs to a single ER, e.g., a unique BP for each of one or more interfaces included in the ER. Other mechanisms for assigning BPs can be implemented as well, such as deriving a BP from a router identifier assigned to a BIER-enabled node, where the derivation utilizes a mapping algorithm. In some embodiments, a bit position in the BM is assigned to a single ER. In other embodiments, a single BP can be assigned to more than one ER. When multiple ERs are assigned the same BP, one of the multiple ERs can assume ownership of the BP at a given time, and ownership can be transferred between the multiple ERs. Ownership of the BP can be transferred to another one of the multiple ERs for any of several reasons, such as a failover in response to a node or link failure, or if one of the multiple ERs otherwise becomes unavailable, in response to changing network conditions, due to time-sharing considerations, and the like. Assigning one BP to multiple ERs facilitates operation similar to anycast, in which packets are forwarded to one receiver of a group of receivers, where each receiver in the group of receivers uses a common address.

One technique involves assigning a single address, (e.g., a loopback address) and a single BP to multiple BIER-enabled nodes in a BIER network. Multicast data packets should be forwarded to only one of the BIER-enabled nodes. To determine which of the multiple BIER-enabled nodes will receive multicast data packets, another type of identifier (e.g., a routing prefix) can be used to distinguish between the BIER-enabled nodes. For example, prefixes of different lengths are assigned to each of the multiple BIER-enabled nodes. Forwarding information is then configured such that multicast data packets are forwarded to the BIER-enabled node that has the longest prefix, and not to the other BIER-enabled nodes that have the same loopback. In response to determining that the BIER-enabled node with the longest loopback is no longer active (e.g., due to failure, the prefix being withdrawn, or the like), multicast data packets are automatically forwarded instead to the BIER-enabled node that has the next longest prefix.

Dynamic assignment of a BP involves assigning a BP to an ER for a certain amount of time, and then changing the BP associated with the ER to a different BP and/or assigning the BP to a different ER. For example, it may be desired to forward a multicast data stream to a first ER during a specified time period and to a second ER during a different time period. If a particular BP is assigned to the first ER, and the network is configured to forward the multicast data stream to the BP, the multicast data stream will be forwarded to the first ER. If the BP is then reassigned to the second ER, the multicast data stream will instead be forwarded to the second ER. BP assignment (which ER a given BP is assigned to) could also be changed based on network conditions, such as node or link utilization. For example, in response to a controller detecting that a link or node is congested, the controller could change the BP of an ER such that traffic is redirected away from the congested link or node and is forwarded along a different path, thereby alleviating the congestion. Changing the BP assignments accomplishes this without affecting the IR, since the packet is still being forwarded using the same BM. Dynamic BP assignment may involve BIER-enabled nodes modifying their routing information and/or forwarding information to reflect the changed BP assignments, or utilization of different routing information and/or forwarding information for different BP assignments.

Only the ERs in a BIER network are assigned a BP. All other BIER-enabled nodes in the network don't need a BP to participate in BIER. This helps to reduce the number of bits assigned in a network. As shown in the example of FIG. 2, network 200 utilizes a four bit BM. Each of the three ERs in network 200 is assigned a BP: node 214 is assigned BP {0001}; node 216 is assigned BP {0010}; and node 218 is assigned BP {0100}.

BM Routing and Forwarding Tables

Once a BP is assigned to an ER, the ER advertises its BP along with its router identifier, to some or all of the other nodes in the BIER network. In one embodiment, the ER advertises its BP via an interior gateway protocol (IGP). For example, ISIS and/or OSPF can be modified to assist in distributing this information through the BIER network using link state updates. Other flooding mechanisms to distribute the information are possible. BIER-enabled nodes, not just the ERs, also flood their router identifier, which is used in building network topology and unicast forwarding tables. BIER-enabled nodes, in one embodiment, advertise additional information as well, such as a BM size that the BIER-enabled node is configured to use. Adding a BP to the advertised information is a relatively small amount of additional information, as compared with the state information maintained on a per-group basis in traditional multicast.

Each BIER-enabled node in the BIER network uses the advertised BPs and router identifiers of the other BIER-enabled nodes to generate one or more bit routing tables (BRTs) and bit forwarding tables (BFTs). A bit routing table (see Table 1 below) is a table that stores BP-to-router identifier mappings, e.g., as learned via the IGP. Each BIER-enabled node receives BP-to-router identifier mappings and stores them in a BRT. Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the BP, and the interface via which the neighbor is reachable. In one embodiment, the NBR is the next hop on a shortest path (SPT) towards the ER that advertised the BP. In one embodiment, the BRT includes one entry per BP.

TABLE 1

An example BRT maintained by BIER-enabled node 208 of FIG. 2.

| BP | Address | NBR | Interface |
|------|----------|---------|-----------|
| 0001 | 10.0.0.1 | 1.1.1.1 | 2 |
| 0010 | 10.0.0.2 | 1.1.1.1 | 2 |
| 0100 | 10.0.0.3 | 1.1.2.1 | 3 |

Each BIER-enabled node translates its BRT(s) into one or more bit forwarding tables (BFTs). Generating a BFT involves, in one embodiment, first sorting the BRT by neighbor. For entries in the BRT that have a common NBR, the BPs of those entries are OR'd together, creating a collapsed BP entry. Table 2, below, shows a BFT generated from the BRT of Table 1. The first and second BP in Table 1 have the same NBR (1.1.1.1). Therefore, the BPs are OR'd, resulting in a single entry. Also, since multicast data packet forwarding is performed based on the BPs, the routable address column is not shown.

TABLE 2

An example BFT maintained by BIER-enabled node 208 of FIG. 2.

| BP | NBR | Interface |
|------|-------|-----------|
| 0011 | 1.1.1.1 | 2 |
| 0100 | 1.1.2.1 | 3 |

Table 2 shows that if a multicast data packet having a BP of either {0001} or {0010} set arrives at a BIER-enabled node with the shown BFT, the multicast data packet should be forwarded to NBR 1.1.1.1 (BIER-enabled node 210 in the example of FIG. 2) via interface 2. If a multicast data packet arrives having BP {0100} set, the multicast data packet should be forwarded to NBR 1.1.2.1 (BIER-enabled node 210 in the example of FIG. 2) via interface 3. If a multicast data packet having BP {0100} and {0001} (having a BM of {0101}), the multicast data packet should be forwarded to both NBR 1.1.1.1 and NBR 1.1.2.1.

Signaling

When a receiver (e.g., a host, such as host 203 of FIG. 2) wishes to join a multicast group, the receiver sends a message (e.g., using IGMP) to the BIER-enabled ER the receiver is coupled to (either directly or indirectly). The message includes information identifying the multicast group the host wishes to join and/or information identifying a source associated with the group. In the example of FIG. 2, host 203 can send an IGMP message to CE node 213 and CE node 213 can then forward the IGMP message to BIER-enabled node 214. In response to receiving a message indicating a receiver wishes to join a multicast group, the ER signals its interest in the multicast group identified in the message. This involves, in one embodiment, the ER sending a signaling message to any IRs in the network, or to a controller, indicating the ER's interest in the multicast group and including the ER's BP.

The ER can send the signaling message only to IRs and/or potential multicast sources or can flood the signaling message to all nodes in the network. For example, if the network is using source-specific multicast (SSM), the ER knows the source of the multicast group (e.g., from the IGMP message from the receiver) and can look up a path to the specified IR and send the signaling message to that IR. If SSM is not the type of multicast being used, the ER can flood the signaling message to all candidate IRs. Only IRs parse the message to determine group and BP information, all other nodes can discard the message. Receivers joining and unsubscribing from multicast groups do not create churn or require any changes in the state information (e.g., BFTs) maintained by the core (BIER-enabled) nodes, unlike with traditional multicast. Instead, join or unsubscribe messages signal an IR to change the BM associated with a given multicast group. This involves only the IR updating state information (e.g., updating a group membership table associated with the group) and not the core nodes. This represents a significant improvement over traditional multicast, in which trees are set up and torn down throughout the network based on the join and unsubscribe messages.

Bit Masks

An IR, such as BIER-enabled node 206 of FIG. 2, maintains state information that includes an entry for each multicast group that the IR receives multicast data packets for. In one embodiment, the IR maintains the state in a group membership table (GMT), as shown at 224 of FIG. 2. In one embodiment, each entry includes information identifying the multicast group (such as a multicast group name and/or an address of a source for the multicast group), a list of BPs corresponding to ERs that have expressed interest (e.g., via a signaling message) in the multicast group identified in the group field, and a BM, which identifies all of the ERs that have expressed interest in the multicast group (e.g., by having a bit set in the bit position corresponding to each ER that has expressed interest in the multicast group). In response to receiving a signaling message from an ER indicating that the ER is interested in a multicast group, the IR sets the bit corresponding to the ER's BP in the BM that corresponds to the multicast group. When the ER is no longer interested in receiving multicast data packets for the multicast group, the ER signals to the IR, e.g., using an unsubscribe message, and the IR clears the corresponding bit in the BM. The BIER network forwards multicast data packets through the BIER network based on the BM. The IR transmits the BM along with multicast data packets into the BIER network. There are number of different techniques available for transmitting the BM. This description refers to encapsulating the BM into the multicast data packet. This terminology covers not only incorporating the BM into the multicast data packet (e.g., as header or payload information), but also appending or prepending some or all of the BM to the multicast data packet.

Packet Forwarding

After encapsulating the BM into a multicast data packet, the IR forwards the multicast data packet to one or more BIER-enabled nodes using the IR's BFTS(s). A BIER-enabled node that receives the multicast data packet determines, using the BM in the multicast data packet and the BIER-enabled node's own BFT(s), whether to forward the multicast data packet to one or more of its neighbors, and if so, to which one(s). To do so, the BIER-enabled node compares the BM in the multicast data packet with the entries in the BIER-enabled node's BFT. In one embodiment, the BIER-enabled node performs a logical AND operation between the multicast data packet's BM and the entries in the BIER-enabled node's BFT. As noted, the BIER-enabled node's BFT includes, in one embodiment, an entry for each neighbor of the BIER-enabled node, and each entry includes a BP field that indicates which ERs are reachable along a shortest path via the neighbor identified in the entry. If the result of the AND is TRUE for a given neighbor, the BIER-enabled node forwards the multicast data packet to that neighbor. A TRUE result indicates that an entry for a given neighbor in the BIER-enabled node's BFT has one or more bits in the BP field set to 1 and that a corresponding bit (or bits) in the multicast data packet's BM is also set to 1. The set bits in the multicast data packet's BM indicate which ERs have expressed interest in the multicast group, and the set bit in the BIER-enabled node's BFT entry indicates that the ER that has expressed interest is reachable via the neighbor indicated in the entry. A BIER-enabled node forwards a multicast data packet that contains a BM to all neighbors for which the bit-wise AND operation between the BM in the multicast data packet and the entries in the BIER-enabled node's BFT is TRUE.

In the example of FIG. 2, BIER-enabled node 214 (an ER) signals to BIER-enabled node 206 (an IR) that BIER-enabled node 214 is interested in receiving packets associated with a given multicast group or flow. BIER-enabled node 216 likewise signals BIER-enabled node 206 that BIER-enabled node 216 is interested in the same multicast group. The signaling is represented by the dashed lines shown in FIG. 2. BIER-enabled node 206 updates an entry in group membership table 224 (or creates one if one does not already exist) for the multicast group and updates a BM in the entry by setting bits corresponding to BIER-enabled nodes 214 and 216. Assuming that only BIER-enabled nodes 214 and 216 are interested in the flow, and not BIER-enabled node 218, the BM is {0101}.

BIER-enabled node 206 is configured to receive a multicast data packet addressed to the multicast group or flow (e.g., from source 201 via CE node 211). BIER-enabled node 206 uses the multicast group address and/or source address included in the multicast data packet to access its GMT and select a BM associated with the multicast group. After selecting a BM that corresponds to the multicast group from the GMT, BIER-enabled node 206 encapsulates the BM for that multicast group into the multicast data packet and identifies the neighbors to which the packet will be forwarded (e.g., using its BFT 226). In one embodiment, this involves performing an AND operation between the BM and each entry in BIER-enabled node 206's BFT. In this example, there is only one entry in the BFT and the entry corresponds to BIER-enabled node 208. This means that the shortest path from BIER-enabled node 206 to all three of the ERs in network 200 runs through BIER-enabled node 208. Since the result of the AND is TRUE for NBR B (BIER-enabled node 208), BIER-enabled node 206 forwards the multicast data packet to BIER-enabled node 208. BIER-enabled node 206 also modifies the BM in the multicast data packet it forwards, as discussed below.

In response to receiving the multicast data packet, BIER-enabled node 208 performs an AND between the BM in the multicast data packet, {0101}, and each entry in its BFT (shown at 228). The result for NBR C is TRUE so BIER-enabled node 208 forwards the multicast data packet to BIER-enabled node 210. BIER-enabled node 208 also modifies the BM in the multicast data packet it forwards, as discussed below. The result for NBR E is also TRUE, so BIER-enabled node 208 replicates the multicast data packet and forwards the multicast data packet to BIER-enabled node 216, which is an ER.

BIER-enabled node 210, in response to receiving the multicast data packet, performs an AND between the BM in the multicast data packet, {0001}, and each entry in its BFT (shown at 230). The result for NBR D is TRUE so BIER-enabled node 210 forwards the multicast data packet to BIER-enabled node 214 which is an ER. The result for NBR F is FALSE, so BIER-enabled node 210 refrains from forwarding the multicast data packet to BIER-enabled node 218. In this way the multicast data packet travels from the IR (BIER-enabled node 206), through the BIER network, to the two ERs that signaled an interest in the multicast group (BIER-enabled nodes 214 and 216).

Loop/Duplication Prevention

As discussed above, a BIER-enabled node is configured to receive a multicast data packet having a BM that has one or more bits set, where each set bit corresponds to a particular ER towards which the multicast data packet should be forwarded by the BIER-enabled node that has received the multicast data packet. If the BIER-enabled node determines that an ER corresponding to one of the set bits is not reachable via a given neighbor, the BIER-enabled node may still forward the multicast data packet to the neighbor (e.g., because a different ER is reachable via the neighbor). However, prior to doing so, the BIER-enabled node clears the bit (in the BM of the multicast data packet) that corresponds to the BIER-enabled node that is not reachable via the neighbor to which the multicast data packet is being forwarded. In one embodiment, the BIER-enabled node overwrites the BM in the multicast data packet that is forwarded with the result of the AND between the BM of the incoming multicast data packet and the BM in the BFT entry corresponding to the neighbor the multicast data packet is being forwarded to. This prevents looping and duplication by ensuring that a BIER-enabled node forwards a given multicast data packet based on a given BP only once.

In the example of FIG. 2, BIER-enabled node 216 is connected to BIER-enabled node 208 and BIER-enabled node 210. As noted above, BIER-enabled node 208 forwards the multicast data packet (based on the BM of {0101} in the multicast data packet) to both BIER-enabled node 210 and BIER-enabled node 216. If BIER-enabled node 208 forwarded the multicast data packet to BIER-enabled nodes 210 and 216 with the original BM ({0101}, as included by BIER-enabled node 216), BIER-enabled node 216 would forward the multicast data packet (based on its BFT, shown at 232) again to BIER-enabled node 210. This would result in BIER-enabled node 210 receiving the same multicast data packet twice (once from BIER-enabled node 208 and again from BIER-enabled node 216). Such duplication is undesirable.

To prevent such scenarios, BIER-enabled node 208 resets the bit(s) in the multicast data packet BM that were not reachable (as announced with the IGP) via a specific neighbor before forwarding the multicast data packet to the specific neighbor. For the multicast data packet that BIER-enabled node 208 sends to BIER-enabled node 210, the result of ({0101} AND 0011) is 0001. BIER-enabled node 208 thus sets the BM in the multicast data packet it forwards to BIER-enabled node 210 to {0001}. Based on this BM, BIER-enabled node 210 will not forward the multicast data packet to BIER-enabled node 216, because the bit corresponding to BIER-enabled node 216 is not set in the multicast data packet's BM anymore. Similarly, for the multicast data packet sent from BIER-enabled node 208 to BIER-enabled node 216, BIER-enabled node 208 updates the multicast data packet's BM to include the result of ({0101} AND {0100}), which is {0100}. This prevents BIER-enabled node 216 from forwarding the multicast data packet to BIER-enabled node 210.

In one embodiment, looping and/or duplication are prevented using remote ingress filtering. That is, instead of the BIER-enabled node that is forwarding a multicast data packet to a neighbor resetting bits in the BM prior to forwarding the multicast data packet to the neighbor, the neighbor can reset the bits in response to receiving the multicast data packet. This is known as remote ingress filtering. In the context of remote ingress filtering, the BIER-enabled node that forwards the multicast data packet to the neighbor also advertises to the neighbor the BFT forwarding entry that corresponds to the neighbor to which the multicast data packet is forwarded. In response to receiving the multicast data packet, the neighbor performs an AND operation, as described above, between the advertised BFT entry and the multicast data packet's BM. The neighbor uses the result and its own BFT to perform further forwarding of the multicast data packet.

Another type of looping which can be detrimental to network performance is known as micro-looping. Micro-looping can occur in response to changing network conditions, such as congestion, a node failure, a link failure, or the like. When a shortest path (e.g., to a given ER) changes, each BIER-enabled node in a BIER network updates its routing and forwarding information. However, not every BIER-enabled node completes the updates in the same amount of time. For example, a change to the BIER network topology could occur such that the shortest path from a given BIER-enabled node to a given ER changes from going through a first neighbor to going through a second neighbor. So the BIER-enabled node should update its forwarding information and send multicast data packets addressed to the given ER to the second neighbor rather than the first. However, the BIER-enabled node may send one or more multicast data packets to the second node prior to updating its forwarding information. If the first neighbor updates its BFT before receiving the multicast data packet from the BIER-enabled node, the first neighbor forwards the packet back to the BIER-enabled node (assuming that the shortest path from the first neighbor to the second neighbor is through the BIER-enabled node. Such an occurrence (a multicast data packet being forwarded from one BIER-enabled node to another, and then back again) is known as a micro-loop.

In one embodiment, micro-loops are prevented using ingress filtering. In response to a BIER-enabled node receiving a multicast data packet, the BIER-enabled node determines which neighbor forwarded the multicast data packet to the BIER-enabled node. If the BM in the multicast data packet has bits set that correspond to ERs that are reachable via the neighbor from which the multicast data packet was received, it is likely that a loop has occurred. In response to identifying the neighbor from which the multicast data packet was received, the BIER-enabled node performs an AND operation between the inverse of the entry in the BIER-enabled node's BFT that corresponds to that neighbor and the BM of the multicast data packet. This has the effect of clearing any bits in the multicast data packet's BM that correspond to ERs reachable via that neighbor. The BIER-enabled node uses the result to perform further forwarding of the multicast data packet.

Using an Existing Loop-Free Topology

BIER can be employed in a network environment that includes an existing loop-free topology which renders looping impossible. In such an environment, resetting bits in the BM (as discussed above) can be avoided. An example of such a loop-free topology is a multiprotocol label switching (MPLS) point-to-multipoint (P2MP) label switched path (LSP). Traditionally, multicast data packets forwarded using a P2MP LSP are forwarded to each receiver on the path without looping. Using a multicast data packet's BM, a multicast data packet can be forwarded to only selected (based on the multicast data packet's BM) receivers on the P2MP LSP. When forwarding the multicast data packet, the BM can be forwarded without modification, since the P2MP LSP eliminates the risk of the packet looping.

Another feature associated with using P2MP LSPs is that BPs can be assigned to ERs on a single P2MP LSP. That is, BPs can have significance based on a P2MP LSP. So each P2MP LSP in a network acts as a separate set or domain in that it has its own set of BPs, rather than the entire BIER network being a single large set, and all ERs in the BIER network having BPs from a common pool. For example, if there are 500 ERs in a BIER network, 500 BPs would be utilized to give each ER a unique BP. If, instead, the BIER network includes several P2MP LSPs, with each P2MP LSP having no more than 200 ERs as receivers, each ER can be assigned a unique BP within the context of its P2MP LSP using no more than 200 unique BPs. Additional information (such as a label) identifying the association between a BP and a corresponding P2MP LSP can be used to differentiate between the various P2MP LSP-based BPs when forwarding packets through a BIER network using P2MP LSPs. In one embodiment, BIER-enabled nodes create a BFT for each P2MP LSP, and select which BFT to use for forwarding a multicast data packet based on the label identifying the P2MP LSP.

Figure 3A:
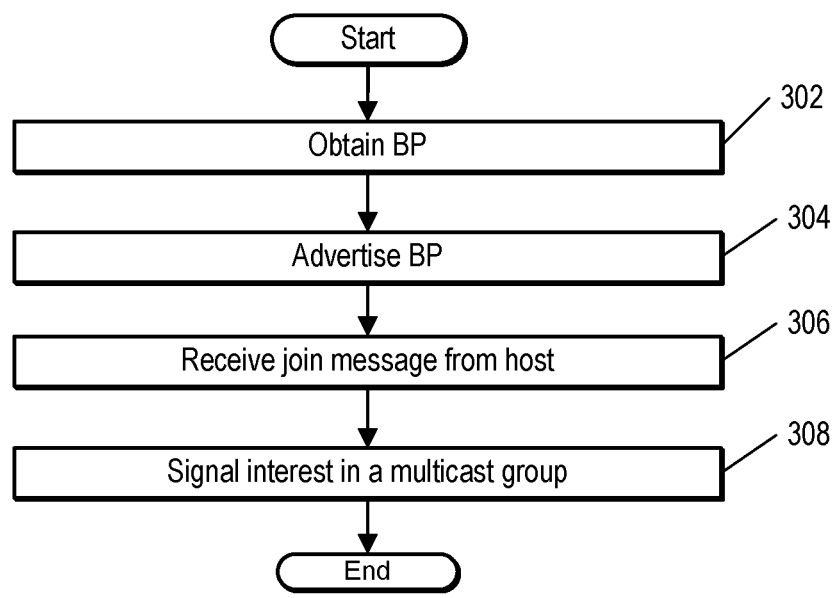
FIG. 3A is a flow chart illustrating an example process employed by a node of FIG. 2.

FIG. 3A is a flowchart showing an example process performed by a BIER-enabled node in a BIER network. In one embodiment, the method is performed by an egress router (ER), such as BIER-enabled node 214 of FIG. 2. At 302, the ER obtains a bit position (BP). In one embodiment, the ER sends a request to a controlling authority, such as a control node or network administrator. The BP can be received automatically in response to the ER joining the BIER network, or can be received in response to the BIER-enabled node signaling an intent to participate in BIER. In one embodiment, BPs are assigned according to an arbitrary sequence, and the controller determines the next available BP and assigns the next available BP to the ER. For example, the controller can assign BP 0 to the first ER to join the BIER network, BP 1 to the second ER to join the BIER network, and so on. In one embodiment, the BPs can be derived from router IDs of the BIER-enabled nodes using a mapping algorithm. For example, the BP can be based on the last digit of network prefix associated with the ER.

In response to receiving its BP, the ER advertises the assigned BP at 304. The ER advertises its BP to all the other BIER-enabled nodes in the BIER network. The ER can advertise additional information, such as its router identifier, bit mask size, and the like. In one embodiment, the ER uses IGP to advertise its BP. Any available mechanism for transmitting information between the BIER-enabled nodes can be used to advertise the BP.

At 306, the ER receives a join message from a host, such as host 203 of FIG. 2. The join message signifies that the host wishes to receive packets associated with a multicast group. The host can be directly coupled to the ER or indirectly coupled through one or more intervening network elements, such as a customer edge node. In one embodiment, the join message is an IGMP message that includes information identifying the multicast group the host is interested in and, in some cases, a source associated with the multicast group. Receiving a join message is one example of how an ER can learn that a host to which it is coupled is interested in a multicast group. Other methods are possible. For example, the ER could learn that a particular host or type of host has come online or connected to the ER and automatically determine that the host should be subscribed to one or more multicast groups.

In response to receiving the join message or otherwise learning that the host wishes to join the multicast group, the ER signals its interest in the multicast group specified by the join message at 308. In one embodiment, the ER first determines whether the ER has already signaled an interest in the multicast group, in which case, the ER foregoes additional signaling. If the ER does not have a current interest registered with an IR for the multicast group, the ER sends a message to one or more IRs and/or candidate IRs expressing an interest in the multicast group. This is referred to as overlay signaling. Overlay signaling can be implemented using various techniques, such as border gateway protocol (BGP) messages, software (SDN) networks mechanisms, or any other available mechanism for providing one-to-many control signaling between multicast sources and receivers. While the example used refers to an ER sending a signaling message to an IR, the ER could also, or in the alternative, send the signaling message to an intermediate control entity.

Figure 3B:
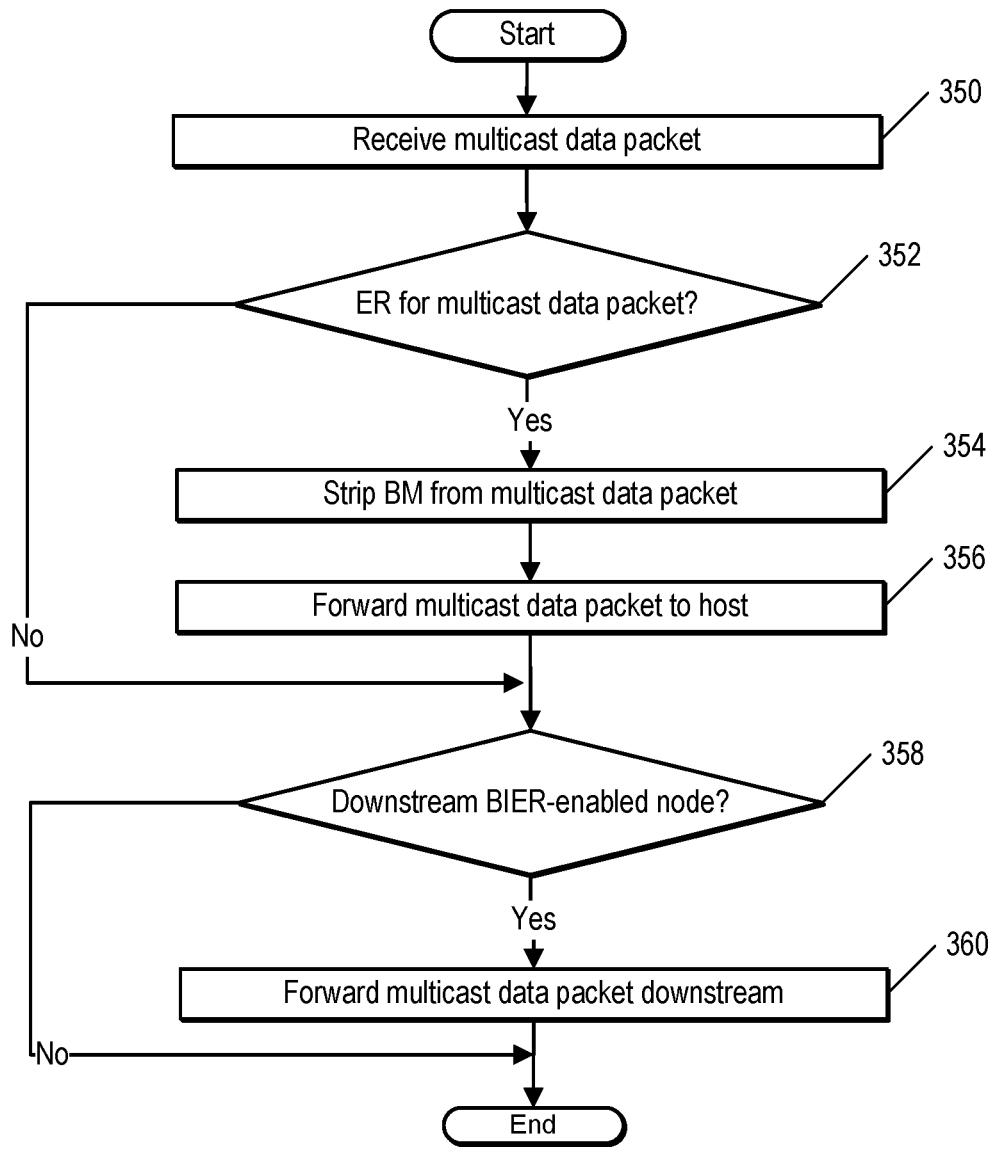
FIG. 3B is a flow chart illustrating an example process employed by a node of FIG. 2.

FIG. 3B is a flowchart showing an example process performed by a BIER-enabled node in a BIER network. In one embodiment, the method is performed by an egress router (ER), such as BIER-enabled node 214 of FIG. 2. At 350, the ER receives a multicast data packet associated with a particular multicast group. At 352, the ER determines whether the ER is an ER for the multicast group identified in the multicast data packet, e.g., that a receiver for the multicast group is connected (directly or indirectly) to the ER. In one embodiment, determining whether the ER is an ER for the multicast group involves the ER comparing its assigned BP with the BM of the incoming multicast data packet. For example, the ER can perform an AND operation between the incoming multicast data packet's BM and a BM having only the BP corresponding to the ER set. If the BP corresponding to the ER is set to 1 in the result of the AND, the ER determines that it is an ER for the multicast data packet. In response to determining that the ER is an ER for the multicast data packet, the ER identifies one or more hosts (receivers) that have subscribed to the multicast group with which the multicast data packet is associated and forwards the packet to the hosts.

At 354, the ER strips the BM from the multicast data packet, and performs any other decapsulation operations. In one embodiment, this involves determining an address for the receiver or a CE node. Address information identifying the receiver and/or CE node can be included in the multicast data packet. The ER forwards the packet to the host(s) at 356.

In one embodiment, the ER is not coupled to any other downstream BIER-enabled nodes, and thus the multicast data packet should not be forwarded to any other BIER-enabled nodes. To determine whether this is the case, at 358 the ER, in one embodiment, compares the multicast data packet's BM with the ER's BFT. Based on this comparison, the ER can determine that the multicast data packet's BM does not contain any set bits that correspond to the ER's neighbors. That is, if the results of an AND between the multicast data packet's BM and each entry in the ER's BFT is all 0s, there are no downstream BIER-enabled nodes the multicast data packet should be forwarded to. If there are no downstream BIER-enabled nodes the multicast data packet should be forwarded to, the ER does not forward the multicast data packet towards any downstream BIER-enabled nodes. Otherwise, at 360, the ER updates the multicast data packet's BM and forwards the multicast data packet, as discussed below. In one embodiment, a BIER-enabled node may receive a multicast data packet with a BM that includes all 0s. Such a multicast data packet is likely the result of an error, and the BIER-enabled node discards the packet. In one embodiment, an ER may not have a BFT and may be configured to automatically function as an ER (e.g., strip the BM from the packet and identify a receiver to which the multicast data packet should be forwarded) for all multicast data packet's the ER receives.

Figure 4A:
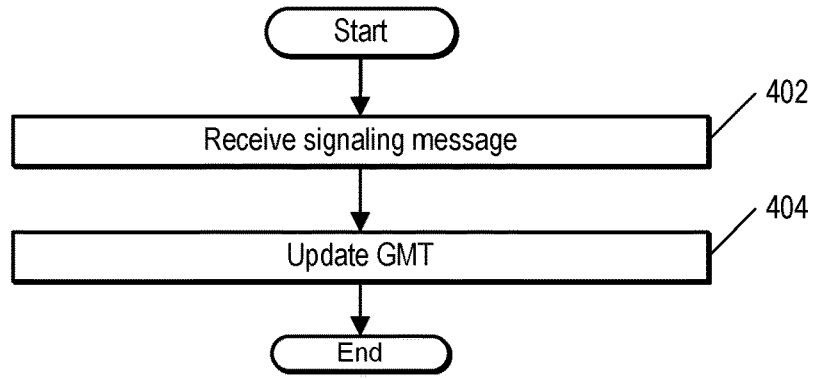
FIG. 4A is a flow chart illustrating an example process employed by a node of FIG. 2.

FIG. 4A is a flowchart illustrating a method that can be performed by a BIER-enabled node of FIG. 2. In one embodiment, the method is performed by an ingress router (IR), such as BIER-enabled node 206. At 402, the IR receives an overlay signal message. In one embodiment, the message is received from an egress router (ER), such as BIER-enabled node 214 of FIG. 2, or from an intermediate control entity between the ER and the IR. The signaling message indicates that the ER either wishes to receive multicast data packets associated with a particular multicast group or data flow, or discontinue receiving multicast data packets associated with a particular multicast group or flow. The signaling message includes, in one embodiment, information identifying the multicast group, such as a multicast group name and/or source address. The signaling message also includes a bit position corresponding to the ER.

At 404, the IR updates a bit mask (BM) in an entry of a group membership table (GMT) maintained by the IR. The IR selects an entry that corresponds to the multicast group identified in the signaling message. If no entry exists for the multicast group, the IR creates an entry in the GMT that includes information identifying the multicast group and a BM with all bit positions set to zero. If an entry corresponding to the multicast group identified in the signaling message exists in the GMT, or after creating such an entry, the IR updates the BM in the entry. The IR determines whether the signaling message is a join message or an unsubscribe (prune) message. If the signaling message is a join message, the IR ensures that a bit is set in the BM field of the entry corresponding the multicast group, where the bit corresponds to the ER from which the signaling message was received. If the bit is already set, the IR takes no action. If the bit is not set, the IR sets the bit. If the signaling message is an unsubscribe message, the IR ensures that the bit corresponding to the ER is cleared in the BM field of the GMT entry associated with the multicast group. If the bit is set, the IR clears the bit. If the bit is already cleared, the IR disregards the signaling message.

Figure 4B:
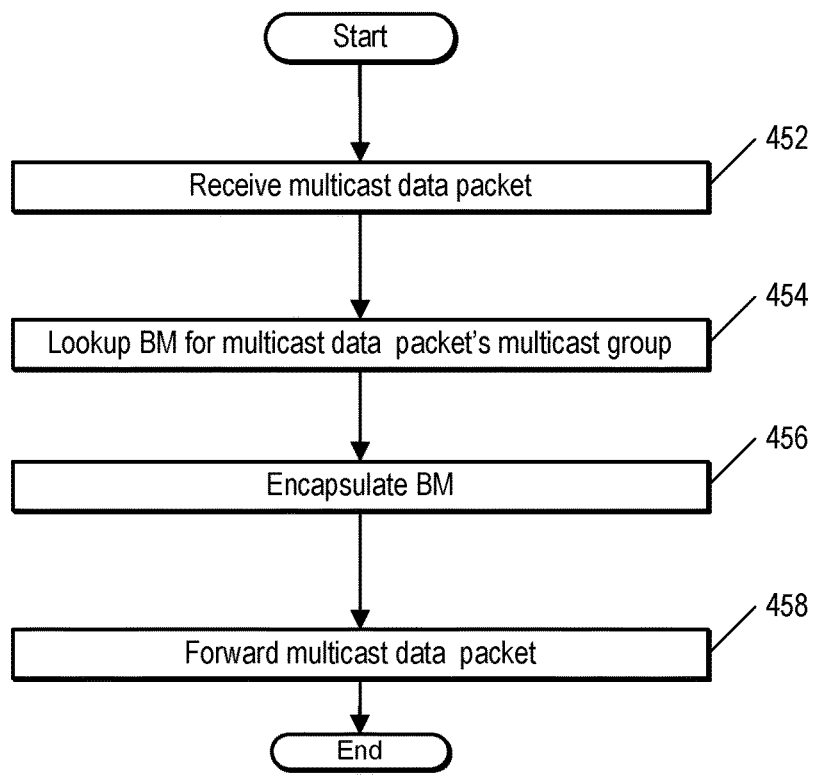
FIG. 4B is a flow chart illustrating an example process employed by a node of FIG. 2.

FIG. 4B is a flowchart illustrating a method that can be performed by a BIER-enabled node of FIG. 2. In one embodiment, the method is performed by an ingress router (IR), such as BIER-enabled node 206. At 452, the IR receives a multicast data packet that includes information (e.g., a multicast group address and/or source address) identifying a multicast group or flow. In one embodiment, the multicast data packet is received from a host, such as host 201 of FIG. 1, configured to act as a source for the multicast group. The source can be directly coupled to the IR, or indirectly coupled through one or more intervening network elements, such as a CE node.

At 454, the IR looks up a BM for the multicast group or flow identified by the multicast data packet in the GMT maintained by the IR. The IR encapsulates the BM into the multicast data packet at 456. The IR can be configured, e.g., by a network administrator, to use one of several different encapsulation methods for the BM. This depends on the network configuration and can be, for example, IP, MPLS, or some other encapsulation protocol.

At 458, the IR forwards the multicast data packet, including the BM. Forwarding the multicast data packet involves, in one embodiment, accessing a bit forwarding table (BFT) maintained by the IR, and determining, based on the BM, which neighbors to send the multicast data packet to. In one embodiment, the IR performs a logical AND operation between the BM in the multicast data packet and entries in its BFT and forwards the packet to those neighbors for which the result of the AND is true.

Figure 5:
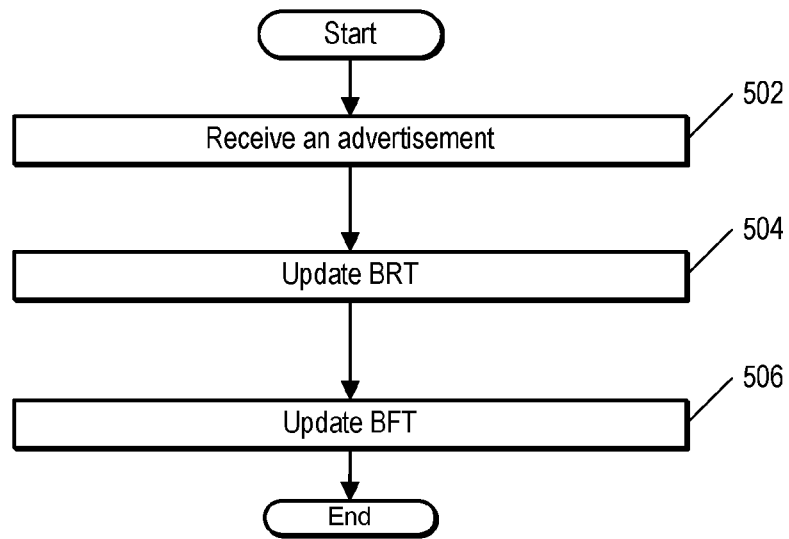
FIG. 5 is a flow chart illustrating an example process employed by a node of FIG. 2.

FIG. 5 is a flowchart illustrating a method that can be performed by a BIER-enabled node of FIG. 2, such as BIER-enabled node 208. At 502, the BIER-enabled node receives an advertisement (e.g., using IGP) from an egress router (ER), such as BIER-enabled node 214 of FIG. 2. In one embodiment, the advertisement includes information identifying a mapping between a routable address associated with the ER, such as a router identifier, and a bit position associated with the ER.

In response to receiving the advertisement, the BIER-enabled node updates a bit routing table (BRT) maintained by the BIER-enabled node, at 504. In one embodiment, this involves adding an entry to the BRT, where the entry includes the router identifier and the BP. The BIER-enabled node also accesses its stored topology information to determine the next hop neighbor along the shortest path towards the ER that sent the advertisement. The BIER-enabled node includes information identifying the next hop router, and/or the interface by which the next-hop router can be reached, in the BRT entry.

At 506, the BIER-enabled node updates a bit forwarding table (BFT). The BFT is based on the BRT. In one embodiment, the BIER-enabled node sorts the BRT by neighbor, and then consolidates entries that have the same neighbor. One way the BIER-enabled node can consolidate the entries is by performing a logical OR operation on the BMs in the entries.

Figure 6:
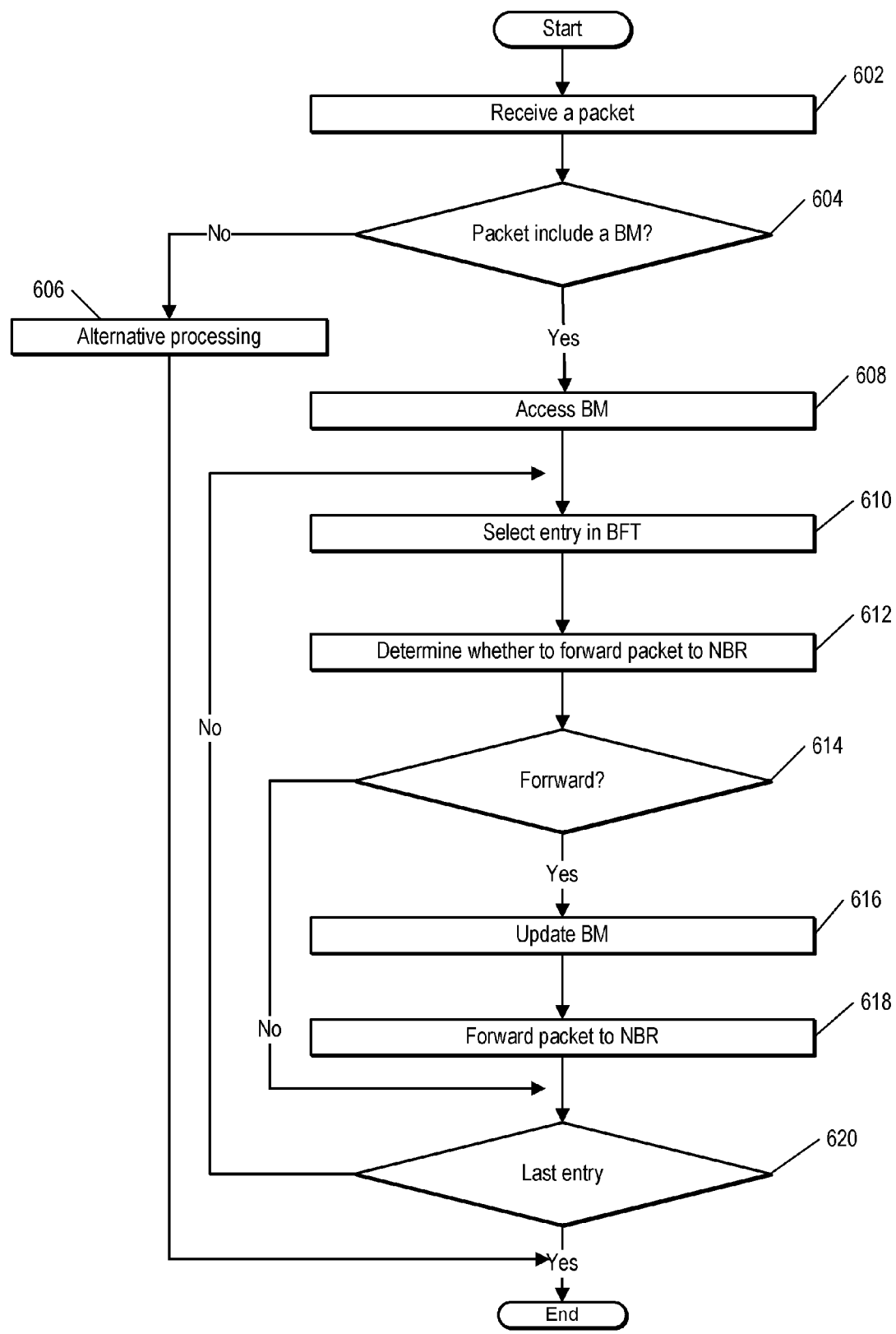
FIG. 6 is a flow chart illustrating an example process employed by a node of FIG. 2.

FIG. 6 illustrates an example method that can be performed by a BIER-enabled node, such as BIER-enabled node 208 of FIG. 2. At 602, the BIER-enabled node receives a multicast data packet. In response to receiving the multicast data packet, the BIER-enabled node determines, at 604, whether the multicast data packet includes a bit mask. The BIER-enabled node can examine the multicast data packet header for a flag, label, or other information indicating that the multicast data packet should be forwarded using BIER. If such information is found, the BIER-enabled node concludes that the multicast data packet includes a bit mask. If the multicast data packet does not include a bit mask, the BIER-enabled node performs alternative processing, at 606. In one embodiment, alternative processing involves dropping the multicast data packet, or forwarding the multicast data packet using a protocol other than BIER.

In response to determining that the multicast data packet does include a bit mask, the BIER-enabled node accesses the bit mask, at 608. In one embodiment, accessing the bit mask involves identifying an encapsulation protocol, and locating the bit mask in the multicast data packet based on the encapsulation protocol type. At 610, the BIER-enabled node selects an entry in the BIER-enabled node's BFT. In one example, the first entry in the BFT is selected and the BIER-enabled node performs an in-order traversal of the BFT.

The BIER-enabled node determines, at 612, whether to forward the multicast data packet to the neighbor associated with the selected BFT entry. In one embodiment, this involves performing an AND operation between the bit mask in the multicast data packet and the bit mask in the selected BFT entry. If the result of the AND operation is true, as determined at 614, the method proceeds to 616, and the BIER-enabled node updates the bit mask in the multicast data packet. In one embodiment, this involves performing an AND operation between the bit mask in the multicast data packet and the bit mask in the selected BFT entry and writing the results of the AND operation into the bit mask in the multicast data packet. This has the effect of clearing bits in bit positions which are not reachable via the neighbor to which the multicast data packet is being forwarded. Doing so prevents duplication or looping problems.

At 618, the BIER-enabled node forwards the multicast data packet to the neighbor corresponding to the BFT entry. At 620, the BIER-enabled node determines whether additional entries remain in the BFT, if so, the method returns to 610, and the next entry in the BFT is selected. Otherwise, the method ends.

Sets

The number of ERs that can be addressed (assigned a BP) is limited by the size of the BM included in the multicast data packet. The concept of sets allows an increase in the number of ERs that can be assigned BPs. The set identifier (SI) is, for example, a number between 0 and 255. The SI allows a BP to be unique in the context of a set. For example, each BP can be re-used in each set. In an embodiment with 256 sets and a BM length of 256 bits, 65536 (256×256) ERs can be supported. Encoding a SI is relatively cheap compared to the BM value because 8 bits are enough to encode 256 SIs. In one embodiment, BIER-enabled nodes in the BIER network generate a BFT for each SI. For example, if two different set identifiers are in use in the BIER network, the BIER-enabled nodes generate two BFTs, one corresponding to each SI. In one embodiment, a BIER-enabled node generates a separate BFT for each SI. In response to receiving a multicast data packet having a SI, the BIER-enabled node uses the SI to select which BFT to use to forward the multicast data packet.

In addition to extending the number of ERs that can be assigned unique BPs, sets can also be used in the context of multi-topology routing (MTR) or to enable temporal slicing. For example, a set of BPs can be assigned to a group of ERs. The ERs use the assigned BPs for a specified time period. A second set of BPs is also assigned to the ERs. The second set of BPs is used for a second time period. In an embodiment implemented in a dual plane network, the controller can assign one plane a first SI and the second plane a second SI.

A controller can determine that conditions exist to switch from forwarding packets using BPs in one set to another. For example, the controller can detect expiration of a specified time period, or receive a signal to switch between topologies in an MTR environment. In one embodiment, the controller centrally determines clustering of ERs within an aggregate collection of transported multicast flows and dynamically assigns and reassigns a SI and BP to all affected ERs. This enables a larger number of ERs to be addressed by a smaller BM. To switch sets, the controller indicates which SI and BM the IR should include in outgoing packets. Based on the SI, BIER-enabled nodes in the network will select a BFT associated with the SI, and forward packets accordingly.

In one embodiment, the SI is included as part of the BM encoding in a multicast data packet. There are alternative mechanisms that can be used to implement sets that facilitate determining the SI from the packet. The methods vary based at least in part on the type of encapsulation used to carry the BM value. For example, if MPLS is used as the encapsulation, each SI could be implemented using a unique label. In one embodiment, if there are receivers for a given multicast flow with different SIs, then the IR sends a copy of the multicast data packet for each SI.

Virtual Bit Position

One way of utilizing sets uses the concept of a virtual bit position (VBP). Each ER is assigned a VBP, e.g., by a controller, as discussed above. If the number of ERs in a BIER network exceeds the maximum BM length, the BP for additional ERs is mapped to a {Set:BP} identifier. Consider an example where the BM length is 256. If 256 ERs have been assigned VBPs 1-256, the BM is used up. When another ER is assigned VBP 257, VBP 257 corresponds to {1:1}. If the BM length were 128 (instead of 256), the VBP 257 would correspond to {2:1}. One advantage of this model is that sets are automatically used to increase the number of ERs based on the available BM size. If a longer BM size becomes available in the network, there is no need for the operator to reconfigure the ERs. The VBP and SI are signaled through the network using IGP and are associated with the ER's routable address.

Multiple Bit Mask Sizes

Some BIER networks can include BIER-enabled nodes that use different BM sizes. For example, some of the BIER-enabled nodes in a BIER network can have a BM size of 256 while other BIER-enabled nodes in the BIER network have a BM size of 128. As used herein, the BM size associated with (or used by) a BIER-enabled node refers to the maximum length BM the BIER-enabled node can support. BIER-enabled nodes support shorter BM lengths. For instance, a BIER-enabled node that has a BM size of 256 also supports BMs of 128 bits. However, a BIER-enabled node that has a BM length of 128 cannot recognize or use BMs that are larger than 128 bits. The difference in BM sizes between BIER-enabled nodes in a BIER network could result in forwarding errors, e.g., if a BIER-enabled node that uses a 128 bit BM receives a multicast data packet that has a BM of 256 bits.

One way to provide interoperability between BIER-enabled nodes that use different length BMs involves sets. Using sets, a longer BM can be converted to a collection of shorter BMs, each shorter BM having a unique set ID. For example, a BIER-enabled node can convert a 256 bit BM into two 128 bit BMs with the least significant 128 bits of the 256 bit BM forming a first 128 bit BM and being assigned a set ID of 0 and the most significant 128 bits of the 256 bit BM forming a second 128 bit BM and being assigned a set ID of 1.

When a BIER-enabled node determines that a multicast data packet should be forwarded to a neighbor (e.g., as described above with reference to 614 of FIG. 6) the BIER-enabled node determines the BM length used by the neighbor. In one embodiment, each BIER-enabled node in a BIER network advertises its BM length to all the other BIER-enabled nodes in the BIER network (e.g., along with advertising its routable address). The BIER-enabled node forwarding a multicast data packet to a neighbor can use the BM length advertised by the neighbor to determine whether the BM in the multicast data packet is the same length as the BM length used by the neighbor. If the neighbor uses a BM length that is the same or longer than the length of the BM in the multicast data packet, the BIER-enabled node does not modify the length of the BM in the multicast data packet. In the case where the neighbor's BM length is longer, the neighbor also supports the shorter length BM.

If the neighbor to which a multicast data packet is being forwarded uses a shorter BM length than the length of the BM in the multicast data packet, the BIER-enabled node that is forwarding the multicast data packet converts the BM in the outgoing multicast data packet to multiple shorter BMs. That is, the BIER-enabled node divides the BM into several new BMs, each of the new BMs being the length used by the neighbor, and each of the new BMs containing a portion of the BM in the multicast data packet, and each of the new BMs being associated with a set ID. The BIER-enabled node then forwards multiple packets, each packet having one of the new BMs and a set ID associated with the new BM.

Figure 7:
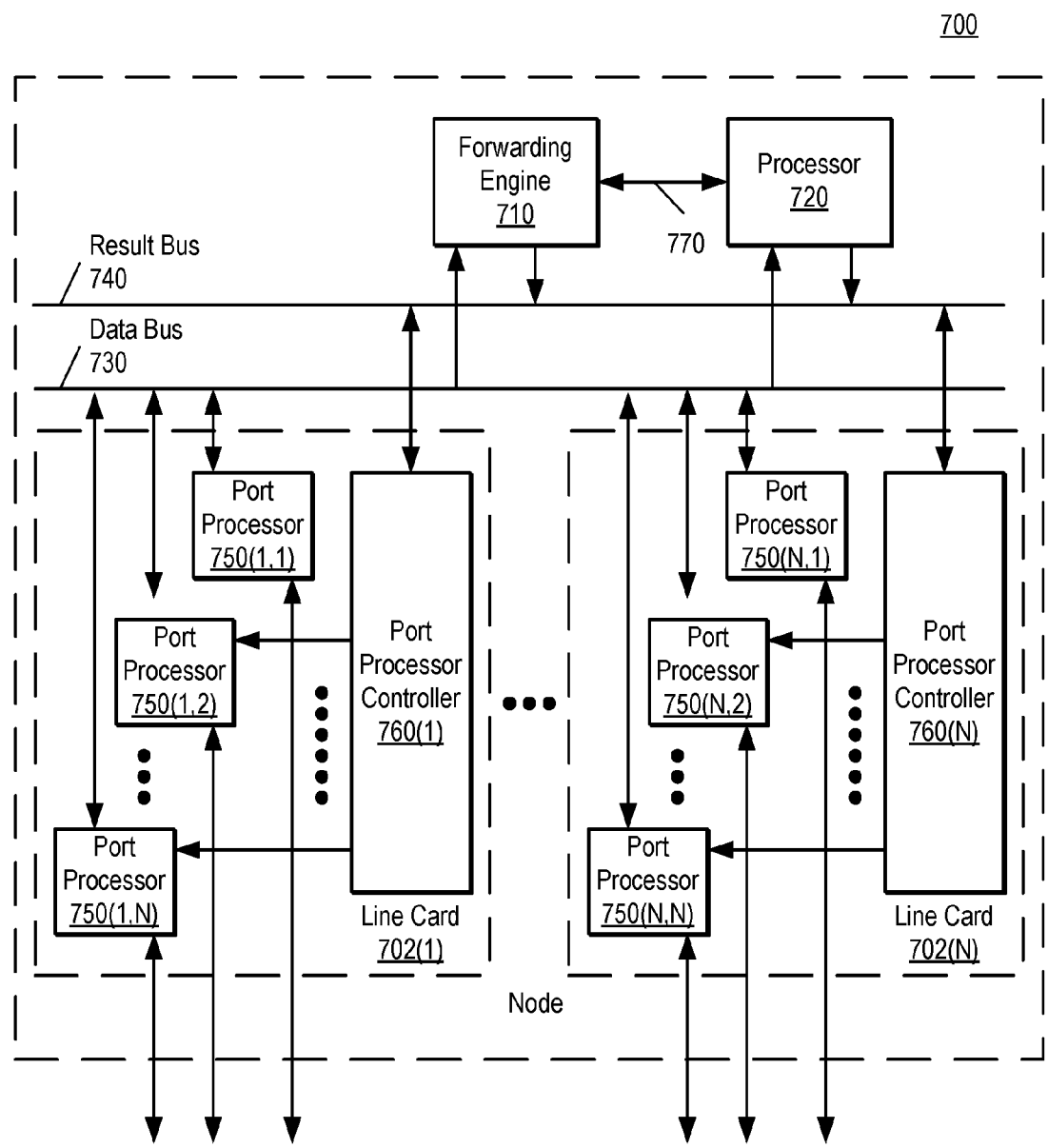
FIG. 7 is a block diagram illustrating certain components of an example node that can be employed in the network of FIG. 2.

FIG. 7 is a block diagram illustrating certain additional and/or alternative components of nodes that can be employed in the networks shown in FIG. 2. In this depiction, node 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet or packet and header are received, the packet or packet and header may be identified and analyzed by router 700 in the following manner. Upon receipt, a packet (or some or all of its control information) or packet and header is sent from the one of port processors 750(1,1)-(N,N) at which the packet or packet and header was received to one or more of those devices coupled to data bus 730 (e.g., others of port processors 650(1,1)-(N,N), forwarding engine 710 and/or processor 720). Handling of the packet or packet and header can be determined, for example, by forwarding engine 710. For example, forwarding engine 710 may determine that the packet or packet and header should be forwarded to one or more of port processors 750(1,1)-(N,N). This can be accomplished by indicating to corresponding one(s) of port processor controllers 760(1)-(N) that the copy of the packet or packet and header held in the given one(s) of port processors 750(1,1)-(N,N) should be forwarded to the appropriate one of port processors 750(1,1)-(N,N). In addition, or alternatively, once a packet or packet and header has been identified for processing, forwarding engine 710, processor 720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 8:
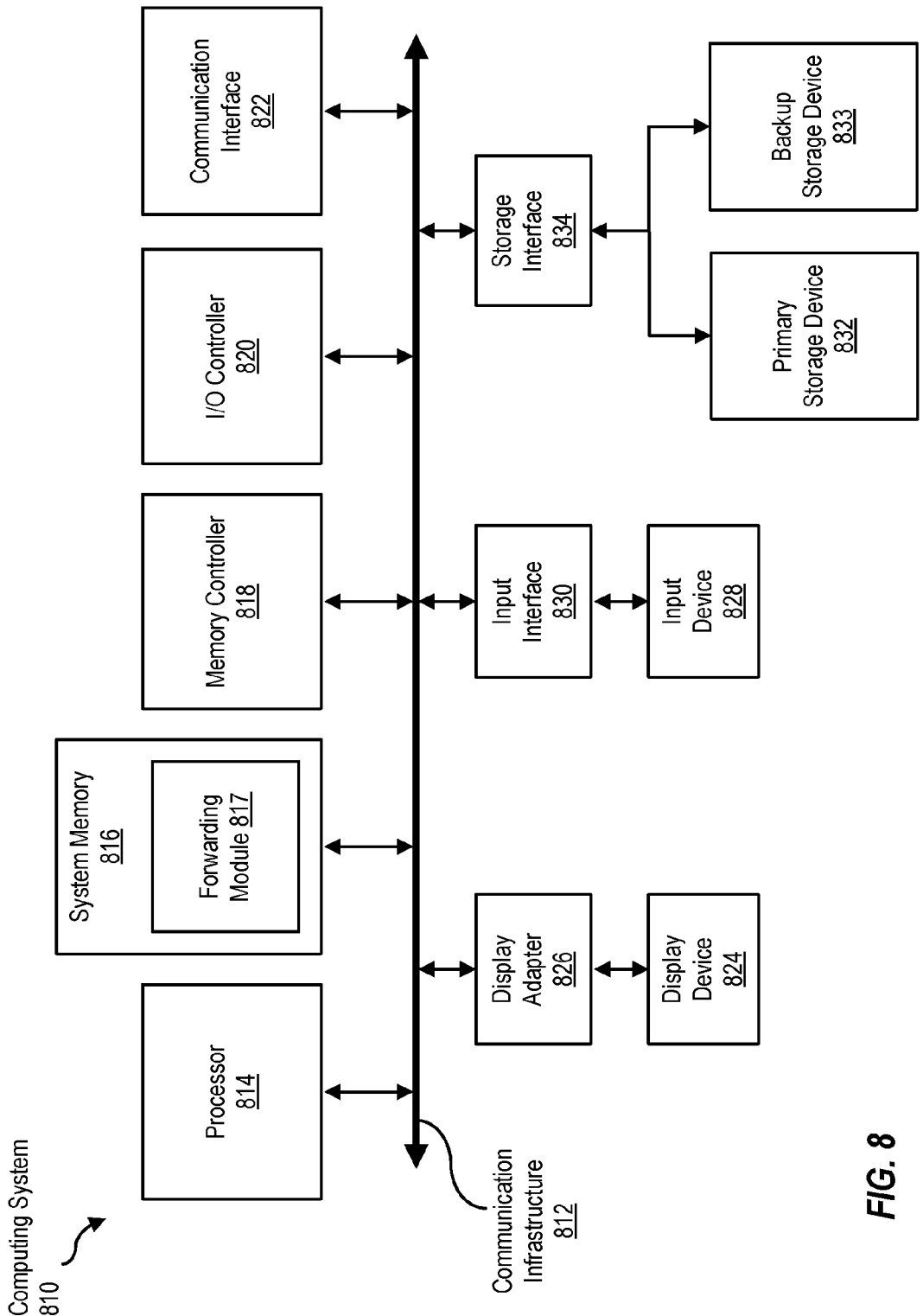
FIG. 8 is a block diagram depicting a computer system suitable for implementing embodiments of the systems described herein.

FIG. 8 is a block diagram of a computing device, illustrating how a forwarding module can be implemented in software, as described above. Computing system 810 broadly represents any single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 810 may include at least one processor 814 and a system memory 816. By executing the software that implements a forwarding module 817, computing system 810 becomes a special purpose computing device that is configured to perform packet forwarding, in the manner described above.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. For example, processor 814 may perform and/or be a means for performing the operations described herein. Processor 814 may also perform and/or be a means for performing any other operations, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, program instructions executable to implement a forwarding module configured to forward multicast data packets may be loaded into system memory 816.

In certain embodiments, computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 814 generally represents any type or form of infrastructure capable of facilitating communication between one or more components of a computing device. Examples of communication infrastructure 814 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 814. In certain embodiments, memory controller 818 may perform and/or be a means for performing, either alone or in combination with other elements, one or more of the operations or features described and/or illustrated herein.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 814 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 814 (or from a frame buffer) for display on display device 824.

As illustrated in FIG. 8, computing system 810 may also include at least one input device 828 coupled to communication infrastructure 814 via an input interface 830. Input device 828 generally represents any type or form of input device capable of providing input, either computer or human generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 814 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. A storage device like primary storage device 832 can store information such as routing tables and forwarding tables.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8.

Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 810 may be configured as an application specific integrated circuit (ASIC) adapted to implement one or more of the embodiments disclosed herein.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
  receiving, at an ingress node of a network configured for bit indexed forwarding, a data packet comprising a multicast group identifier;
  obtaining, from a group membership table stored at the ingress node, a bit mask corresponding to the multicast group identifier, wherein
    the bit mask comprises a plurality of bit positions, and
    each bit position of the plurality of bit positions corresponds to a single respective egress node of the network;
  encapsulating the data packet with the bit mask; and
  forwarding the encapsulated data packet using the bit mask.

2. The method of claim 1, further comprising:
  receiving at the ingress node a signaling message from a first egress node of the network, wherein the signaling message comprises
    a request to join or to leave a multicast group corresponding to the multicast group identifier, and
    a bit position, within the bit mask, assigned to the first egress node.

3. The method of claim 2, further comprising:
  generating or updating an entry in the group membership table using information in the signaling message.

4. The method of claim 1, further comprising:
  receiving at the ingress node an advertisement sent by a first egress node of the network, wherein the advertisement identifies the first egress node and a bit position, within the bit mask, assigned to the first egress node.

5. The method of claim 4, further comprising:
  generating or updating, using information from the advertisement, a bit routing table at the ingress node, wherein an entry of the bit routing table comprises
    an identifier of the first egress node,
    an identifier of the bit position assigned to the first egress node, and
    an identifier of an egress interface or neighbor node via which the first egress node is reachable from the ingress node.

6. The method of claim 5, further comprising:
  generating or updating, using the bit routing table, a bit forwarding table at the ingress node.

7. The method of claim 1, wherein the multicast group identifier comprises an address associated with a multicast group.

8. A network device, comprising:
  one or more network interfaces adapted to receive, at an ingress node of a network configured for bit indexed forwarding, a data packet comprising a multicast group identifier;
  a processor adapted to
    obtain, from a group membership table stored at the network device, a bit mask corresponding to the multicast group identifier of a received data packet, wherein the bit mask comprises a plurality of bit positions, and
      each bit position of the plurality of bit positions corresponds to a single respective egress node of the network,
    encapsulate the received data packet with the bit mask, and
    forward the encapsulated data packet, using the bit mask, via one or more of the network interfaces.

9. The network device of claim 8, wherein the one or more network interfaces are further adapted to receive at the ingress node a signaling message from a first egress node of the network, wherein the signaling message comprises
  a request to join or to leave a multicast group corresponding to the multicast group identifier, and
  a bit position, within the bit mask, assigned to the first egress node.

10. The network device of claim 9, wherein the processor is further adapted to generate or update an entry in the group membership table using information in the signaling message.

11. The network device of claim 8, wherein the one or more network interfaces are further adapted to receive at the ingress node an advertisement sent by a first egress node of the network, wherein the advertisement identifies the first egress node and a bit position, within the bit mask, assigned to the first egress node.

12. The network device of claim 11, wherein the processor is further adapted to generate or update, using information in the advertisement, a bit routing table at the network device, wherein an entry of the bit routing table comprises an identifier of the first egress node, an identifier of the bit position assigned to the first egress node, and an identifier of an egress interface or neighbor node via which the first egress node is reachable from the ingress node.

13. The network device of claim 12, wherein the processor is further adapted to generate or update, using the bit routing table, a bit forwarding table at the network device.

14. The network device of claim 8, wherein the multicast group identifier comprises an address associated with a multicast group.

15. A non-transitory computer readable storage medium comprising executable instructions, wherein a method is implemented in response to executing the instructions, the method comprising:

receiving, at an ingress node of a network configured for bit indexed forwarding, a data packet comprising a multicast group identifier;

obtaining, from a group membership table stored at the ingress node, a bit mask corresponding to the multicast group identifier, wherein the bit mask comprises a plurality of bit positions, and each bit position of the plurality of bit positions corresponds to a single respective egress node of the network;

encapsulating the data packet with the bit mask; and forwarding the encapsulated data packet using the bit mask.

16. The non-transitory computer readable storage medium of claim 15, wherein the method further comprises:

receiving at the ingress node a signaling message from a first egress node of the network, wherein the signaling message comprises a request to join or to leave a multicast group corresponding to the multicast group identifier, and a bit position, within the bit mask, assigned to the first egress node.

17. The non-transitory computer readable storage medium of claim 16, wherein the method further comprises:

generating or updating an entry in the group membership table using information in the signaling message.

18. The non-transitory computer readable storage medium of claim 15, wherein the method further comprises:

receiving at the ingress node an advertisement sent by a first egress node of the network, wherein the advertisement identifies the first egress node and a bit position, within the bit mask, assigned to the first egress node.

19. The non-transitory computer readable storage medium of claim 18, wherein the method further comprises:

generating or updating, using information from the advertisement, a bit routing table at the ingress node, wherein an entry of the bit routing table comprises an identifier of the first egress node, an identifier of the bit position assigned to the first egress node, and an identifier of an egress interface or neighbor node via which the first egress node is reachable from the ingress node.

20. The non-transitory computer readable storage medium of claim 19, wherein the method further comprises:

generating or updating, using the bit routing table, a bit forwarding table at the ingress node.

\* \* \* \* \*